(No Model.)
C. W. HUNT.
COUPLING.
No. 472,707. Patented Apr. 12, 1892.
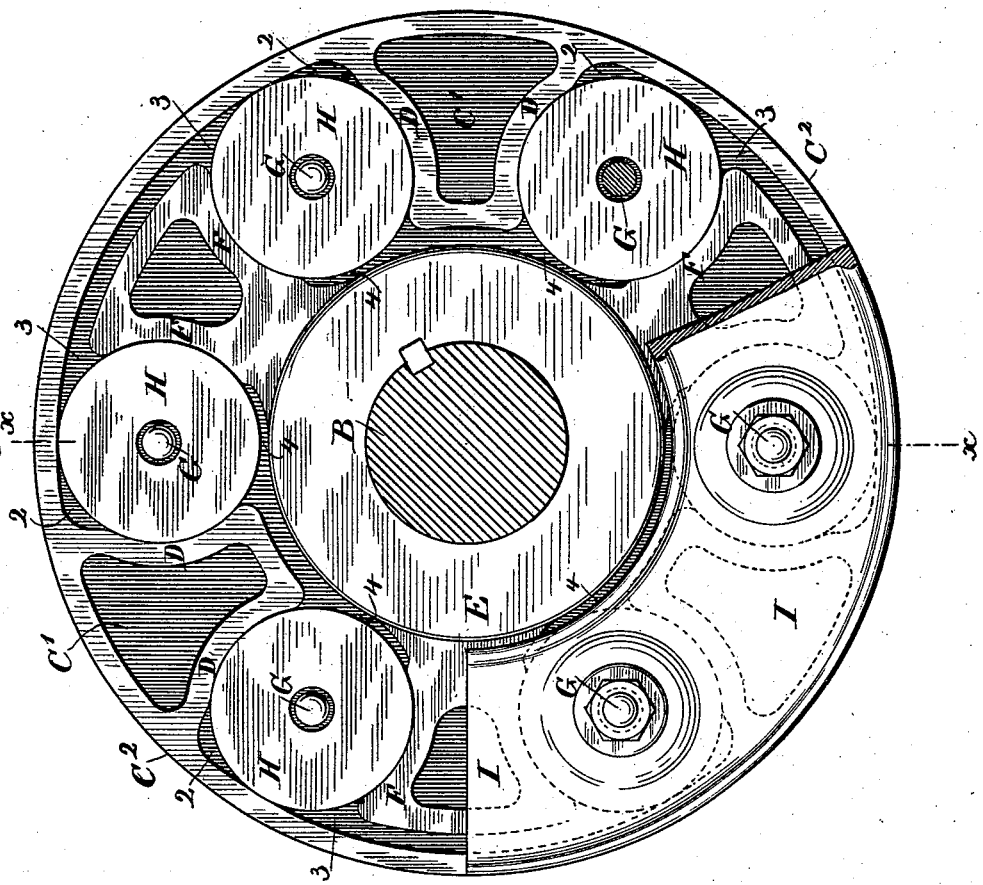
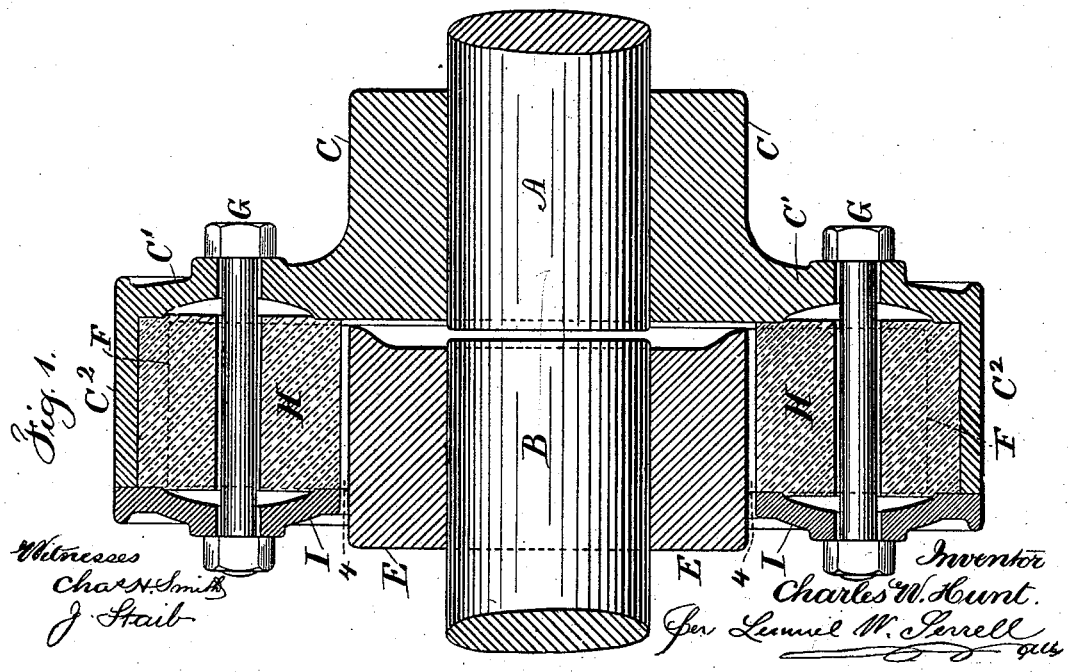
Witnesses
Chas. N. Smith
J. Staib
Inventor
Charles W. Hunt.
Per Lemuel W. Serrell
atty

UNITED STATES PATENT OFFICE.

CHARLES W. HUNT, OF WEST NEW BRIGHTON, NEW YORK.

COUPLING.

SPECIFICATION forming part of Letters Patent No. 472,707, dated April 12, 1892.

Application filed October 6, 1891. Serial No. 407,835. (No model.)

*To all whom it may concern:*

Be it known that I, CHARLES W. HUNT, a citizen of the United States, residing at West New Brighton, in the county of Richmond and State of New York, have invented an Improvement in Couplings, of which the following is a specification.

Shafts of various kinds are frequently made in two parts in line, or nearly so, with each other and coupled together, so that power applied to one part of the shaft is communicated to the other part of the shaft; but the coupling devices usually are rigid, and the parts of the shaft are exposed to unnecessary friction where such parts are not in perfect alignment, and this difficulty arises especially in motors for railway-cars, and in addition to this, where the motor is electric and runs at a high velocity, the inertia of the motor prevents the gearing accommodating itself to slight changes in the relative position of the motor and the car-wheels.

My present improvement is especially adapted to the shafting of electric car-motors; but it may be applied wherever available and is made for allowing the parts to yield in any direction without becoming loose, and the springs themselves bring the shafts into alignment.

In the drawings, Figure 1 represents the end portions of the divided shaft and a section of the coupling at the line $x\ x$ of Fig. 2; and Fig. 2 is an elevation of the coupling, partly in section.

The two portions A B of the shafting are in line, or nearly so, with each other, and upon one shaft, near the end thereof, is a hub C, with an outwardly-projecting disk C' and a rim $C^2$, and there are segmental partitions D within the rim $C^2$ and projecting from the disk C', the outward edges of the segmental partitions being in line, or nearly so, with the edges of the rim $C^2$. Upon the other portion of the shafting A there is a hub E, around which project segmental partitions F, which are formed similarly to the partitions D; but they stand outwardly instead of inwardly, and the number of the partitions F corresponds to the number of partitions D, and they are so shaped that when the hubs C and E are in line the segmental partitions F are within the rim $C^2$, and there are recesses between the pairs of segmental partitions D and F all around the coupling, which recesses are nearly cylindrical, and in constructing the coupling the two cast portions are preferably bored for the reception of the shafting and placed together in the proper relative positions and clamped, and then the nearly-circular recesses are bored out true by a suitable tool, and there is also central with each recess a hole bored in the disk C' for the reception of a bolt G, and during this boring operation the opposite faces of the segmental partitions D and F are turned off true, and a cylindrical rubber spring H is inserted into each of these recesses with a bolt passing through it, and a cover I is applied around the hub E, which cover is perforated for the passage of the bolts G, and the cover is secured by the nuts and bolts. It is advantageous to recess the inner faces of the cover I and the disk C in line with the ends of the rubber springs H, such recesses being concave, as shown in Fig. 1, and the springs H should be of sufficient length to be slightly compressed by the screwing up of the cover I by the bolts G. It will now be apparent that the springs H intervene between the partitions D and F all around the coupling, and hence that the power applied to one portion of the shafting is transmitted to the other portion of the shafting through such springs H, and the metal parts at one side of the coupling do not come into contact with the metal parts at the other side of the coupling at any place; but there is sufficient play and looseness to allow for any inaccuracy in the alignment of the shafting or for any movement that one portion of the shaft may have independent of the other portion of the shafting, and all of the rubber springs are under a slight initial compression; but there is room for the springs to change their form under compression by the rubber being forced out into the end recesses in the disk C' and cover I, and also the rubber may be pressed outwardly into the spaces 2 3 4, and when the rotation is in one direction one set of springs will be under compression, and when the direction of rotation is reversed the alternate springs forming the other set will be under compression; but there cannot be any looseness in the coupling, because the compressed set of springs will expand to their normal position as the rotation stops before the power is applied to the other set of springs by a reversed rotation of the shafting, and it will also be noticed that the two parts of the metallic coupling do not come in contact at any place, and hence the india-rubber springs act as insulators to prevent any electric current passing from one part to another of the shafting.

This coupling is very efficient in communicating power from one part of the shafting to the other, and it allows slight end motion in the shafting, as well as slight differences in the alignment of such shafting, and any jar or concussion received by one part of the shafting is not communicated to the other part of the shafting. The ring-shaped cover I is preferably made in two parts, so that either half can be removed to give access to the springs. There is not any looseness between the bearing parts of the coupling. Hence the parts do not produce noise or concussion when the direction of rotation is reversed, and the coupling is equally well adapted to rotation in either direction, regardless of which part may be the driving-shaft.

I claim as my invention—

1. The combination, in a coupling, of two hubs and similar segmental partitions connected with the respective hubs, the opposite faces of the partitions being concave, and a circular range of cylindrical rubber springs between the respective segmental partitions and adapted to act with uniformity when the shafts are rotated in either direction, substantially as specified.

2. The combination, with two hubs and their shafts, of similar flanges connected with the respective hubs and alternating with each other and a circular range of similar rubber springs pressed tightly into the uniform spaces between the flanges, so that the coupling acts uniformly in either direction and the metallic parts do not come into contact to interfere with the elasticity of the coupling in any direction, substantially as specified.

3. The combination, in a coupling, of hubs secured to the respective portions of the shafting, segmental partitions upon the respective hubs, the partitions of one hub coming between the partitions on the other hub, cylindrical rubber springs between the segmental partitions, bolts passing through the rubber springs, and a cover secured by such bolts, substantially as set forth.

4. The combination, in a coupling, of hubs to be connected to the respective parts of the shafting, segmental partitions upon such hubs, a disk and rim connected with one set of segmental partitions, rubber springs introduced between the pairs of segmental partitions, a cover, and bolts passing through the cover and through the springs, there being concave recesses in the inner face of the cover and disk, respectively, at the ends of the springs, substantially as set forth.

Signed by me this 30th day of September, 1891.

CHAS. W. HUNT.

Witnesses:
GEO. T. PINCKNEY,
WILLIAM G. MOTT.